United States Patent
Li (10) Patent No.: US 9,807,787 B2
(45) Date of Patent: Oct. 31, 2017

(54) METHOD FOR PERFORMING UPLINK TRANSMISSION CONTROL OF AN ELECTRONIC DEVICE, AND ASSOCIATED APPARATUS

(71) Applicant: MEDIATEK INC., Hsin-Chu (TW)

(72) Inventor: Xiu-Sheng Li, Hsinchu (TW)

(73) Assignee: MEDIATEK INC., Hsin-Chu (TW)

(*) Notice: Subject to any disclaimer, the term of this patent is extended or adjusted under 35 U.S.C. 154(b) by 301 days.

(21) Appl. No.: 14/225,439

(22) Filed: Mar. 26, 2014

(65) Prior Publication Data

US 2015/0124783 A1    May 7, 2015

Related U.S. Application Data

(60) Provisional application No. 61/898,610, filed on Nov. 1, 2013.

(51) Int. Cl.
- *H04J 3/00* (2006.01)
- *H04W 72/12* (2009.01)
- *H04L 5/14* (2006.01)

(52) U.S. Cl.
CPC ........... *H04W 72/1273* (2013.01); *H04L 5/14* (2013.01)

(58) Field of Classification Search
CPC ................................................. H04W 72/0413
See application file for complete search history.

(56) References Cited

U.S. PATENT DOCUMENTS

| 2013/0101061 A1* | 4/2013 | Clevorn ................. 375/285 |
| 2013/0223363 A1* | 8/2013 | Sambhwani et al. ...... 370/329 |
| 2015/0049690 A1* | 2/2015 | Sambhwani et al. ...... 370/329 |
| 2016/0014775 A1* | 1/2016 | Kwong ............. H04B 7/2656 370/336 |

FOREIGN PATENT DOCUMENTS

| CN | 1552130 A | 12/2004 |
| CN | 101238688 A | 8/2008 |
| CN | 101779385 A | 7/2010 |
| CN | 103079261 A | 5/2013 |
| WO | 2013127322 A1 | 9/2013 |

* cited by examiner

*Primary Examiner* — Huy D Vu
*Assistant Examiner* — Kevin Cunningham
(74) *Attorney, Agent, or Firm* — Winston Hsu (57) ABSTRACT

A method for performing uplink (UL) transmission control of an electronic device and an associated apparatus are provided, where the method includes the steps of: determining a set of UL transmission patterns for a dedicated physical data channel (DPDCH) and a dedicated physical control channel (DPCCH), wherein one of the set of UL transmission patterns indicates whether UL transmission of a plurality of slots of one of the DPDCH and the DPCCH in at least one transmission time interval (TTI) is required, respectively; and performing UL transmission of the DPDCH and the DPCCH according to the set of UL transmission patterns, wherein with aid of a UL transmission pattern for the DPDCH within the set of UL transmission patterns, UL transmission of at least one slot of the DPDCH is prevented in the at least one TTI. The method may include selecting one of multiple sets of UL transmission patterns.

16 Claims, 11 Drawing Sheets

METHOD FOR PERFORMING UPLINK TRANSMISSION CONTROL OF AN ELECTRONIC DEVICE, AND ASSOCIATED APPARATUS

CROSS REFERENCE TO RELATED APPLICATIONS

This application claims the benefit of U.S. Provisional Application No. 61/898,610, which was filed on Nov. 1, 2013, and is included herein by reference.

BACKGROUND

The present invention relates to improvement of uplink (UL) capacity in communications systems, and more particularly, to a method for performing UL transmission control of an electronic device, and an associated apparatus.

According to the related art, for UL data transmission of a conventional electronic device such as that complying with Universal Mobile Telecommunications System (UMTS)-frequency-division duplexing (FDD) standards, the pilot field of a conventional dedicated physical control channel (DPCCH) can be utilized for channel estimation. However, based on the conventional architecture, and more particularly, the conventional UL dedicated physical data channel (DPDCH)/DPCCH design, some problems such as some side effects may occur. For example, the pilot field in the conventional UL DPCCH transmission requires significant power. In another example, as the pilots of the conventional UL DPCCH transmission can be regarded as interference, the signal-to-interference-plus-noise ratio (SINR) cannot be further increased. Thus, a novel method is required for enhancing the performance of a UMTS-FDD electronic device.

SUMMARY

It is therefore an objective of the claimed invention to provide a method for performing uplink (UL) transmission control of an electronic device, and an associated apparatus, in order to solve the above-mentioned problems.

It is another objective of the claimed invention to provide a method for performing UL transmission control of an electronic device, and an associated apparatus, in order to improve UL capacity in communications systems.

According to at least one preferred embodiment, a method for performing UL transmission control of an electronic device is provided, where the method comprises the steps of: determining a set of UL transmission patterns for a dedicated physical data channel (DPDCH) and a dedicated physical control channel (DPCCH), wherein one of the set of UL transmission patterns indicates whether UL transmission of a plurality of slots of one of the DPDCH and the DPCCH in at least one transmission time interval (TTI) is required, respectively; and performing UL transmission of the DPDCH and the DPCCH according to the set of UL transmission patterns, wherein with aid of a UL transmission pattern for the DPDCH within the set of UL transmission patterns, UL transmission of at least one slot of the DPDCH is prevented in the at least one TTI. More particularly, the step of determining the set of UL transmission patterns for the DPDCH and the DPCCH may further comprise: determining a UL DPDCH transmission pattern, which can be taken as an example of the aforementioned UL transmission pattern for the DPDCH; determining Transmit Power Control (TPC) and Transport Format Combination Indicator (TFCI) transmission patterns; determining at least one transmission pattern of any other field; and determining if a pilot is transmitted in each slot corresponding to transmission of DPDCH, TPC, TFCI, or any other fields.

According to at least one preferred embodiment, an apparatus for performing UL transmission control of an electronic device is also provided, where the apparatus comprises at least one portion of an electronic device. The apparatus comprises a transmitter, and further comprises a processing circuit coupled to the transmitter. The transmitter is arranged to transmit information for the electronic device. In addition, the processing circuit is arranged to determine a set of UL transmission patterns for a DPDCH and a DPCCH, wherein one of the set of UL transmission patterns indicates whether UL transmission of a plurality of slots of one of the DPDCH and the DPCCH in at least one TTI is required, respectively. Additionally, the transmitter performs UL transmission of the DPDCH and the DPCCH according to the set of UL transmission patterns. Besides, with aid of a UL transmission pattern for the DPDCH within the set of UL transmission patterns, UL transmission of at least one slot of the DPDCH is prevented in the at least one TTI. More particularly, the processing circuit determines a UL DPDCH transmission pattern, which can be taken as an example of the aforementioned UL transmission pattern for the DPDCH, determines TPC and TFCI transmission patterns, determines at least one transmission pattern of any other field, and determines if a pilot is transmitted in each slot corresponding to transmission of DPDCH, TPC, TFCI, or any other fields.

It is an advantage of the present invention that the present invention method and the associated apparatus can save power consumption of the electronic device, and therefore the user of the electronic device can utilize the electronic device for a long time between two battery charging operations. In addition, in comparison with the related art, the present invention method and the associated apparatus can improve the UL capacity, and therefore the overall performance can be enhanced.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
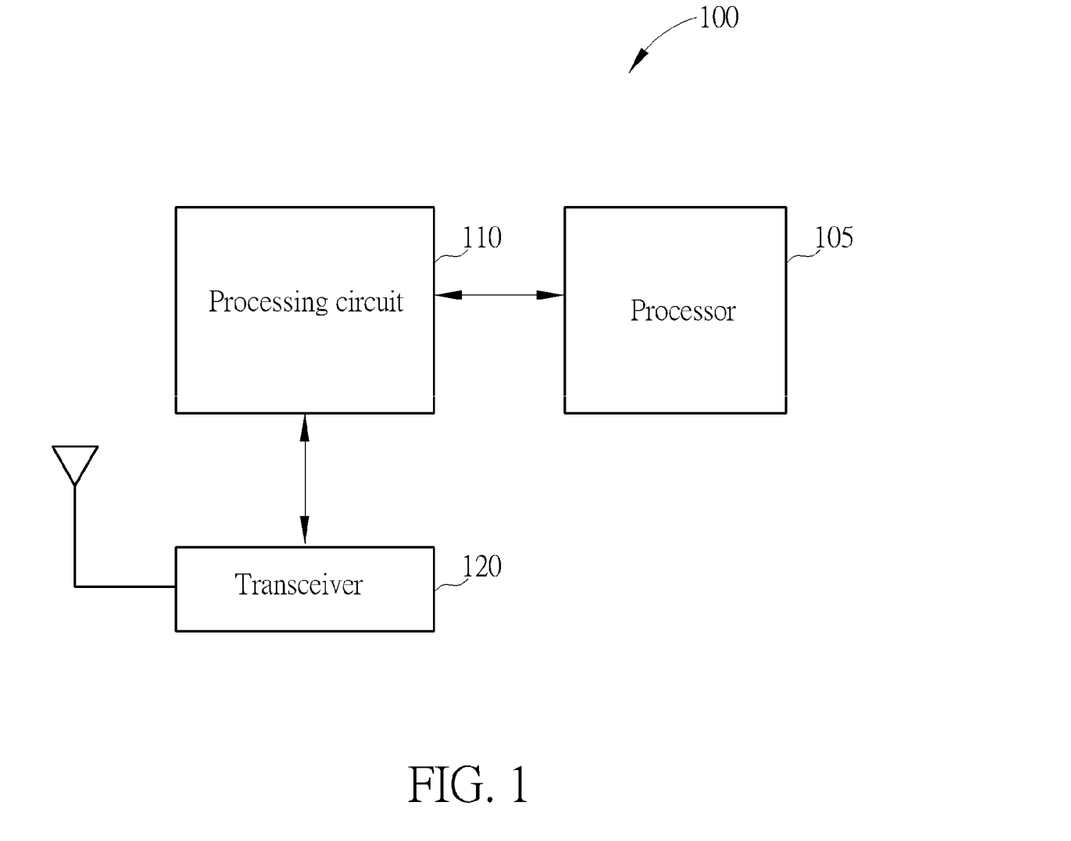
FIG. 1 is a diagram of an apparatus for performing uplink (UL) transmission control of an electronic device according to a first embodiment of the present invention.

Please refer to FIG. 1, which illustrates a diagram of an apparatus 100 for performing uplink (UL) transmission control of an electronic device according to a first embodiment of the present invention, where the apparatus 100 may comprise at least one portion (e.g. a portion or all) of the electronic device. For example, the apparatus 100 may comprise a portion of the electronic device mentioned above, and more particularly, can be at least one hardware circuit such as at least one integrated circuit (IC) within the electronic device. In another example, the apparatus 100 can be the whole of the electronic device mentioned above. In another example, the apparatus 100 may comprise a system comprising the electronic device mentioned above (e.g. an audio/video system comprising the electronic device). Examples of the electronic device may include, but not limited to, a mobile phone (e.g. a multifunctional mobile phone), a personal digital assistant (PDA), and a personal computer such as a laptop computer.

As shown in FIG. 1, the apparatus 100 may comprise a processor 105 arranged to control operations of the electronic device, and may comprise a processing circuit 110 arranged to perform UL and downlink (DL) transmission control for the electronic device, and may further comprise a transceiver 120 arranged to transmit or receive information for the electronic device, where the processor 105 and the transceiver 120 are coupled to the processing circuit 110, and one or more antennas of the electronic device may be coupled to the transceiver 120. For example, the transceiver 120 may comprise a transmitter and a receiver such as those for wireless network communications, where the processor 105 may execute some program codes (e.g. program instructions). According to this embodiment, the transmitter within the transceiver 120 is arranged to transmit information for the electronic device, and more particularly, may perform UL transmission under control of the processing circuit 110. This is for illustrative purposes only, and is not meant to be a limitation of the present invention. According to some variations of this embodiment, the processor 105 may be integrated into the processing circuit 110.

Figure 2:
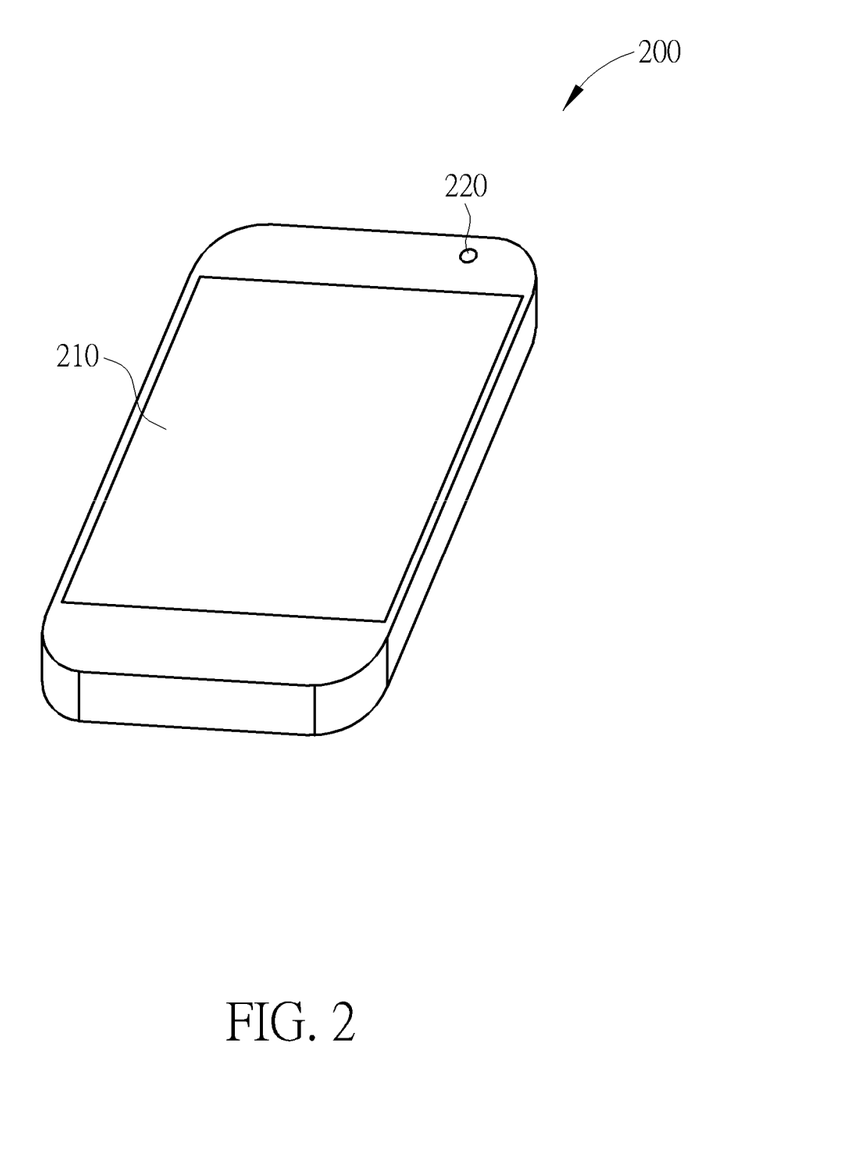
FIG. 2 illustrates a multifunctional mobile phone involved with the apparatus shown in FIG. 1 according to an embodiment of the present invention.

FIG. 2 illustrates a multifunctional mobile phone 200 involved with the apparatus 100 shown in FIG. 1 according to an embodiment of the present invention, where the multifunctional mobile phone 200 can be taken as an example of the electronic device mentioned above. As shown in FIG. 2, the multifunctional mobile phone 200 may comprise a touch sensitive display module 210 and a camera 220. This is for illustrative purposes only, and is not meant to be a limitation of the present invention.

Figure 3:
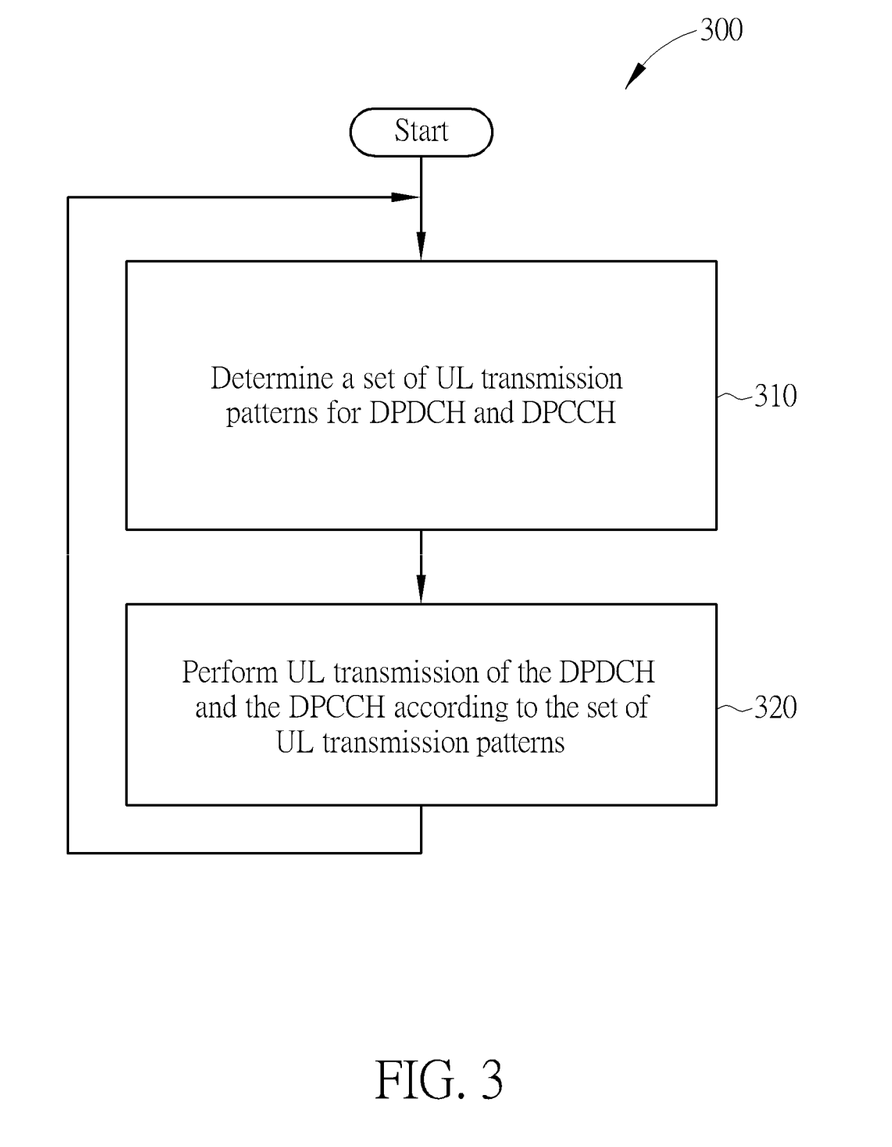
FIG. 3 illustrates a flowchart of a method for performing UL transmission control of an electronic device according to an embodiment of the present invention.

FIG. 3 illustrates a flowchart of a method 300 for performing UL transmission control of an electronic device according to an embodiment of the present invention. The method 300 shown in FIG. 3 can be applied to the apparatus 100 shown in FIG. 1 (more particularly, the multifunctional mobile phone 200 of the embodiment shown in FIG. 2), and can be applied to the processing circuit 110 thereof and the transceiver 120 shown in FIG. 1 (more particularly, the transmitter within the transceiver 120) that operates under control of the processing circuit 110. The method can be described as follows.

In Step 310, the processing circuit 110 determines a set of UL transmission patterns (e.g. a set of transmission slot patterns) for a dedicated physical data channel (DPDCH) and a dedicated physical control channel (DPCCH), where one of the set of UL transmission patterns indicates whether UL transmission of a plurality of slots (or time slots) of one of the DPDCH and the DPCCH (e.g. the DPDCH or the DPCCH) in at least one transmission time interval (TTI) (e.g. one or more TTIs) is required, respectively. In practice, a TTI may comprise one or more frames (e.g. one frame, two frames, four frames, or eight frames), where each frame may comprise fifteen slots (or time slots). This is for illustrative purposes only, and is not meant to be a limitation of the present invention. According to some embodiments of the present invention, such as some variations of this embodiment, the processing circuit 110 may determine a UL DPDCH transmission pattern, determine Transmit Power Control (TPC) and Transport Format Combination Indicator (TFCI) transmission patterns, and determine at least one transmission pattern of any other field, and further determine if a pilot is transmitted in each slot corresponding to transmission of DPDCH, TPC, TFCI, or any other fields.

In Step 320, the transmitter within the transceiver 120 performs UL transmission of the DPDCH and the DPCCH according to the set of UL transmission patterns (more particularly, the set of UL transmission patterns that is just determined in Step 310), where with aid of a UL transmission pattern for the DPDCH (e.g. the UL DPDCH transmission pattern mentioned above) within the set of UL transmission patterns, UL transmission of at least one slot of the DPDCH is prevented in the aforementioned at least one TTI. More particularly, the transmitter within the transceiver 120 may utilize the DPDCH to transmit UL data in some slots, without transmitting data in the aforementioned at least one slot of the DPDCH in the aforementioned at least one TTI. Thus, the apparatus 100 may utilize both of the DPCCH and the DPDCH based on the set of UL transmission patterns mentioned above. This is for illustrative purposes only, and is not meant to be a limitation of the present invention. In another example, the apparatus 100 may utilize a new channel such as a TFCI channel. More particularly, in the aforementioned at least one TTI, the transmitter within the transceiver 120 may transmit at least one TFCI by utilizing the TFCI channel, rather than any of the original channels such as the DPCCH.

According to this embodiment, based on at least one predetermined rule (e.g. one or more predetermined rules), the processing circuit 110 determines a UL transmission pattern for the DPCCH (e.g. a UL DPCCH transmission pattern) within the set of UL transmission patterns according to at least one characteristic (e.g. one or more characteristics) of the DPDCH, to prevent at least one pilot of at least one slot of the DPCCH from being transmitted in the aforementioned at least one TTI. More particularly, based on the aforementioned at least one predetermined rule, when it is detected that no UL transmission of a specific slot of the DPDCH in the aforementioned at least one TTI is required, the processing circuit 110 determines the UL transmission pattern for the DPCCH to selectively prevent UL transmission of a corresponding slot of the DPCCH in the aforementioned at least one TTI according to at least one characteristic of the DPCCH. For example, based on the aforementioned at least one predetermined rule (e.g. a specific predetermined rule), when it is detected that no UL transmission of the specific slot of the DPDCH in the aforementioned at least one TTI is required and UL transmission of any of a TFCI field and a TPC field within the corresponding slot of the DPCCH in the aforementioned at least one TTI is not required, the processing circuit 110 determines the UL transmission pattern for the DPCCH to prevent UL transmission of the corresponding slot of the DPCCH in the aforementioned at least one TTI. As a result, the aforementioned at least one pilot of the aforementioned at least one slot of the DPCCH can be prevented from being transmitted in the aforementioned at least one TTI. This is for illustrative purposes only, and is not meant to be a limitation of the present invention. In another example, based on the aforementioned at least one predetermined rule (e.g. another predetermined rule), when it is detected that no UL transmission of the specific slot of the DPDCH in the aforementioned at least one TTI is required and UL transmission of any of the TFCI field and the TPC field within the corresponding slot of the DPCCH in the aforementioned at least one TTI is required, the processing circuit 110 determines the UL transmission pattern for the DPCCH to allow UL transmission of the corresponding slot of the DPCCH in the aforementioned at least one TTI.

In another example, based on the aforementioned at least one predetermined rule (e.g. another predetermined rule), when it is detected that no UL transmission of the specific slot of the DPDCH in the aforementioned at least one TTI is required and UL transmission of any of the TFCI field and the TPC field within the corresponding slot of the DPCCH in the aforementioned at least one TTI is required and UL transmission of a pilot field within an adjacent slot of the DPCCH in the aforementioned at least one TTI is required, the processing circuit 110 determines the UL transmission pattern for the DPCCH to prevent UL transmission of a pilot field within the corresponding slot of the DPCCH in the aforementioned at least one TTI.

In another example, based on the aforementioned at least one predetermined rule (e.g. another predetermined rule), when it is detected that no UL transmission of the specific slot of the DPDCH in the aforementioned at least one TTI is required and an acknowledgement (ACK) for downlink (DL) is determined to be sent before a time point of the specific slot of the DPDCH in the aforementioned at least one TTI, the processing circuit 110 determines the UL transmission pattern for the DPCCH to prevent UL transmission of at least one subsequent slot (e.g. one or more subsequent slots) of the DPCCH in the aforementioned at least one TTI, where the aforementioned at least one subsequent slot of the DPCCH comprises the corresponding slot of the DPCCH.

In practice, the processing circuit 110 may set at least one transmission slot pattern indicator TSP_ind (e.g. one or more transmission slot pattern indicators) based on the aforementioned at least one predetermined rule, for use of performing UL transmission of the DPDCH and the DPCCH, where an element of the plurality of elements indicates whether to transmit content of at least one field (e.g. one or more fields) within an associated slot of the plurality of slots of the aforementioned one of the DPDCH and the DPCCH (e.g. the DPDCH or the DPCCH) in the aforementioned at least one TTI. For example, the notation N may represent the number of frames in a TTI. In a situation where each frame comprise fifteen slots, the transmission slot pattern indicator TSP_ind may comprise a plurality of elements such as $\{a_0, a_1, a_2, \ldots, a_{15N-1}\}$, and the transmission slot pattern indicator TSP_ind can be expressed as follows:

$$\text{TSP\_ind} = [a_0, a_1, a_2, \ldots, a_{15N-1}];$$

where each of the elements $\{a_0, a_1, a_2, \ldots, a_{15N-1}\}$ of the transmission slot pattern indicator TSP_ind, such as the element $a_i$ (e.g. i=0, 1, ..., or (15N−1)), may comprise at least one bit (e.g. one or more bits). More particularly, in a situation where the element $a_i$ comprises a single bit, the element $a_i$ can be utilized for indicating whether to transmit the content of all field(s) within the slot associated to this element $a_i$. For example, any two of the elements $\{a_0, a_1, a_2, \ldots, a_{15N-1}\}$ of the transmission slot pattern indicator TSP_ind may be independent of each other, and within the elements $\{a_0, a_1, a_2, \ldots, a_{15N-1}\}$ of the transmission slot pattern indicator TSP_ind, the number of elements whose value is equivalent to one may fall with the range of the interval [0, 15N]. This is for illustrative purposes only, and is not meant to be a limitation of the present invention. In some other examples, in a situation where the element $a_i$ comprises multiple bits, each bit of the element $a_i$ can be utilized for indicating whether to transmit the content of the corresponding field within the slot associated to this element $a_i$. In some other examples, the transmission slot pattern indicator TSP_ind can be defined arbitrarily when needed.

In some examples, the processing circuit 110 may utilize multiple transmission slot pattern indicators {TSP_ind} indicating multiple UL transmission patterns such as multiple transmission slot patterns, respectively, where transmission slot patterns indicated by these transmission slot pattern indicators {TSP_ind} may be regular or irregular, based on different conditions that may be encountered. Examples of the fields which can be indicated by using the transmission slot pattern indicators {TSP_ind} may include (but not limited to) Data, TPC, TFCI, and pilot fields, where any slot of the DPDCH can be regarded as the Data field.

Please note that the processing circuit 110 may adjust a spreading factor of the electronic device, and may further adjust at least one of the power difference between the power of the DPCCH and the power of the DPDCH, the ratio of the power of the DPCCH to the power of the DPDCH, and the reciprocal of the ratio, in order to guarantee the performance of the apparatus 100. Besides, the working flow shown in FIG. 3 comprises a loop, which comprises Step 310 and Step 320. While the loop index of the loop shown in FIG. 3 varies, the number of frames (or the number of slots) in a TTI (e.g. any TTI within the aforementioned at least one TTI) may change. For example, when the loop index is equivalent to a specific value, the number of frames in a TTI can be equivalent to one of a plurality of predetermined values {1, 2, 4, 8}. In another example, when the loop index is equivalent to another value, the number of frames in a TTI can be equivalent to another of the plurality of predetermined values {1, 2, 4, 8}. Thus, the UL transmission patterns (or transmission slot patterns) utilized for multiple times of executing the loop shown in FIG. 3 may be different, and more particularly, may comprise some sets of transmission slot patterns {$Pattern_{TTI=1\ frame}$, $Pattern_{TTI=2\ frames}$, $Pattern_{TTI=4\ frames}$, $Pattern_{TTI=8\ frames}$} respectively corresponding to different frame counts per TTI. This is for illustrative purposes only, and is not meant to be a limitation of the present invention.

In addition, while the loop index of the loop shown in FIG. 3 varies, the number of TTIs within the aforementioned at least one TTI (e.g. the aforementioned one or more TTIs) may change. For example, when the loop index is equivalent to a specific value, the number of TTIs within the aforementioned at least one TTI can be equivalent to one a natural number. In another example, when the loop index is equivalent to another value, the number of TTIs within the aforementioned at least one TTI can be equivalent to another natural number. Thus, for example, a set of transmission slot patterns "Pattern 1" may be repeatedly utilized as the set of UL transmission patterns mentioned in Step 310 during multiple TTIs for a specific time of executing the loop shown in FIG. 3, and another set of transmission slot patterns "Pattern 2" may be utilized as the set of UL transmissions patterns mentioned in Step 310 during one TTI for another time of executing the loop shown in FIG. 3. This is for illustrative purposes only, and is not meant to be a limitation of the present invention.

Additionally, while the loop index of the loop shown in FIG. 3 varies, the set of UL transmission patterns that is determined in Step 310 may change, and therefore the set of UL transmission patterns that is utilized in Step 320 may change correspondingly. For example, when the loop index is equivalent to a specific value, the set of UL transmission patterns that is determined in Step 310 can be a specific set of UL transmission patterns, and therefore the set of UL transmission patterns that is utilized in Step 320 can be the specific set of UL transmission patterns. In another example, when the loop index is equivalent to another value, the set of UL transmission patterns that is determined in Step 310 can be another set of UL transmission patterns, and therefore the set of UL transmission patterns that is utilized in Step 320 can be the other set of UL transmission patterns. More particularly, the candidate UL transmission patterns to be utilized for multiple times of executing the loop shown in FIG. 3 may comprise the aforementioned sets of transmission slot patterns {$Pattern_{TTI=1\ frame}$, $Pattern_{TTI=2\ frames}$, $Pattern_{TTI=4\ frames}$, $Pattern_{TTI=8\ frames}$} and the aforementioned sets of transmission slot patterns "Pattern 1" and "Pattern 2", and may further comprise another set of transmission slot patterns "Legacy Pattern" which follows the current transmission pattern in UMTS specification and indicates that the content of all slots of the DPDCH and DPCCH should be transmitted in the aforementioned at least one TTI. This is for illustrative purposes only, and is not meant to be a limitation of the present invention.

According to some embodiments, such as some variations of this embodiment, the processing circuit 110 may dynamically select one set of a plurality of sets of UL transmission patterns (e.g. a plurality of sets of transmission slot patterns), and may dynamically perform UL transmission of the DPDCH and the DPCCH according to the selected one set of the plurality of sets of UL transmission patterns, where the plurality of sets of UL transmission patterns may comprise the set of UL transmission patterns mentioned in Step 310. For example, the plurality of sets of UL transmission patterns may comprise a first set of UL transmission patterns and a second set of UL transmission patterns that are utilized in TTIs of different conditions, respectively, where the set of UL transmission patterns mentioned in Step 310 can be one set of the first set of UL transmission patterns and the second set of UL transmission patterns. This is for illustrative purposes only, and is not meant to be a limitation of the present invention. In another example, the plurality of sets of UL transmission patterns may comprise two or more sets of UL transmission patterns respectively corresponding to different numbers of slots per TTI, where the set of UL transmission patterns mentioned in Step 310 is one set of the aforementioned two or more sets of UL transmission patterns.

According to some embodiments of the present invention, in comparison with the related art, at least one of TFCI transmission and TPC command transmission can be partially omitted to reduce the number of pilots to be transmitted. For example, in a situation where TFCI transmission is partially omitted in one of these embodiments, utilizing fewer TFCI bits or different TFCI transmission ways does not significantly degrade system performance. In another example, in a situation where TPC command transmission is partially omitted in another of these embodiments, utilizing fewer TPC commands does not significantly degrade system performance. Please note that, in these embodiments, it is typical to allocate data only in some slots rather than all slots. More particularly, in these embodiments, with various control schemes regarding field control and/or data allocation, such as determination of the UL DPDCH transmission pattern and determination of the UL DPCCH transmission pattern, it is workable to skip transmitting pilots in some slots. As a result of skipping transmitting pilots, the number of pilots can be reduced, and therefore the received power in Node B is reduced correspondingly, causing the overall interference to be reduced, and thus the UL capacity can be improved.

According to some embodiments of the present invention, pilot transmission in some slots is necessary only when there is TFCI, TPC, Data, or any other field transmission. More particularly, in one of these embodiments, as long as there is pilot transmission near a slot such as the corresponding slot mentioned in some examples, pilot transmission of this slot can be skipped. For example, in a situation where there is pilot transmission in a nearby slot that is used for TFCI, TPC, Data, or any other field (e.g. the adjacent slot mentioned above), this slot can be skipped, where reducing the total power of pilot transmission by skipping transmitting pilots in some slots enhances the overall UL system capacity.

Figure 4:
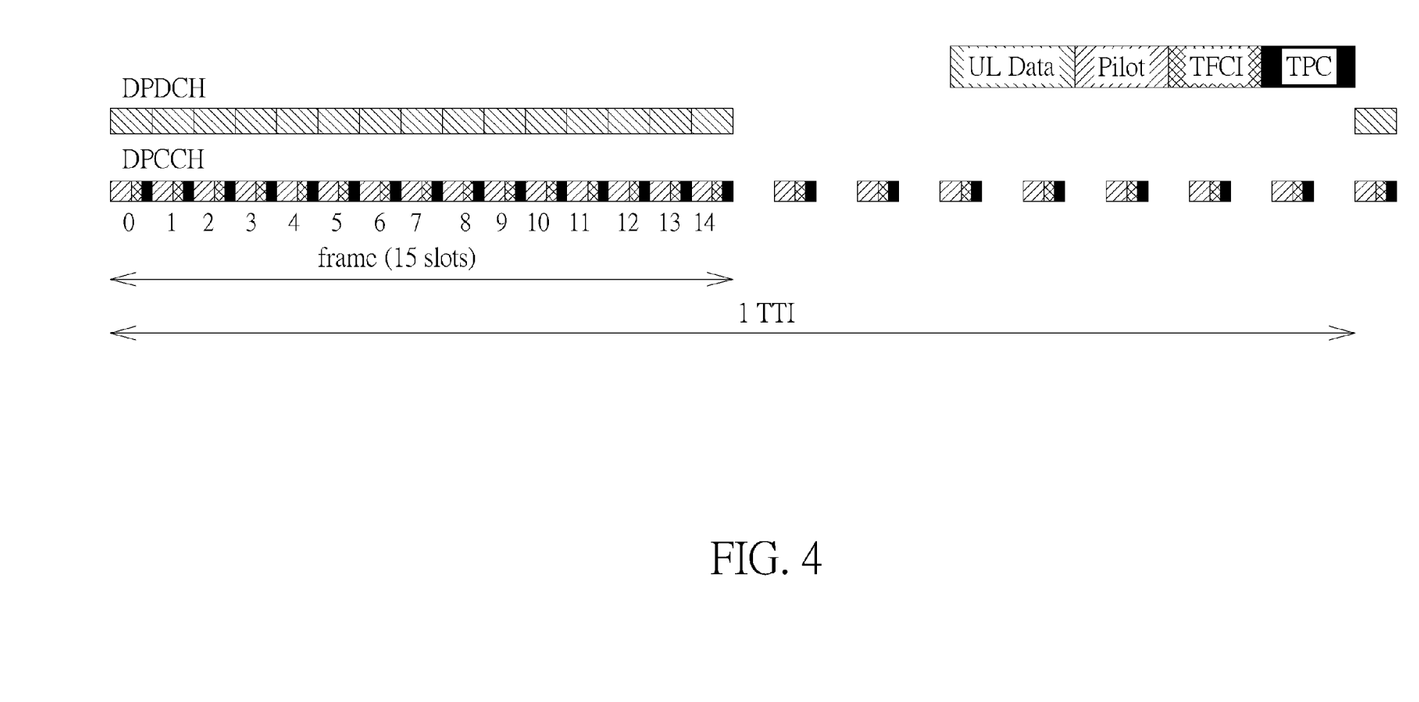
FIG. 4 illustrates a control scheme involved with the method shown in FIG. 3 according to an embodiment of the present invention.

FIG. 4 illustrates a control scheme involved with the method 300 shown in FIG. 3 according to an embodiment of the present invention, where a set of transmission slot patterns for the DPDCH and the DPCCH are illustrated, and the set of transmission slot patterns for the DPDCH and the DPCCH in this embodiment (i.e. the first row and the second row of this set of transmission slot patterns, respectively) can be taken as an example of the set of UL transmission patterns mentioned in Step 310.

As shown in FIG. 4, this set of transmission slot patterns corresponds to thirty slots per TTI (i.e. N=2). The empty slots in any row of this set of transmission slot patterns (e.g. the slots that are illustrated with nothing in the first row and the second row within this set of transmission slot patterns) indicates that UL transmission of these slots should be prevented, and is forbidden by the processing circuit 110. For example, in this TTI, the UL data are transmitted in slots {0, 1, 2, 3, 4, 5, 6, 7, 8, 9, 10, 11, 12, 13, 14}, the pilots are transmitted in slots {0, 1, 2, 3, 4, 5, 6, 7, 8, 9, 10, 11, 12, 13, 14, 16, 18, 20, 22, 24, 26, 28}, the TFCIs are transmitted in slots {0, 1, 2, 3, 4, 5, 6, 7, 8, 9, 10, 11, 12, 13, 14, 16, 18, 20, 22, 24, 26, 28}, and the TPC commands are transmitted in slots {0, 1, 2, 3, 4, 5, 6, 7, 8, 9, 10, 11, 12, 13, 14, 16, 18, 20, 22, 24, 26, 28}. Similar descriptions for this embodiment are not repeated in detail here.

Figure 5:
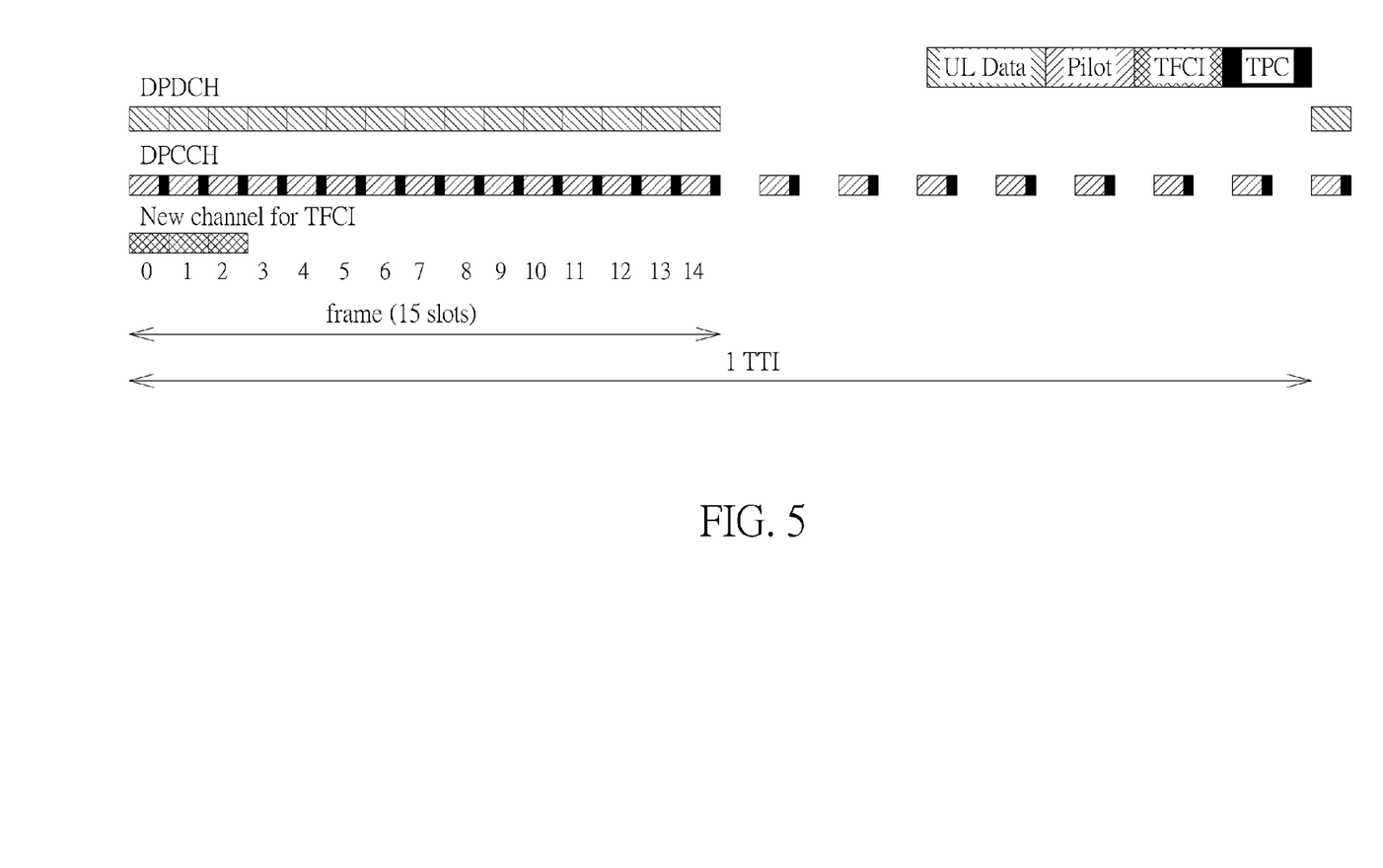
FIG. 5 illustrates a control scheme involved with the method shown in FIG. 3 according to another embodiment of the present invention.

FIG. 5 illustrates a control scheme involved with the method 300 shown in FIG. 3 according to another embodiment of the present invention, where a set of transmission slot patterns for the DPDCH, the DPCCH, and a new channel such as the TFCI channel mentioned above are illustrated, and the set of transmission slot patterns for the DPDCH, the DPCCH, and the TFCI channel in this embodiment (i.e. the first row, the second row, and the third row of this set of transmission slot patterns, respectively) can be taken as an example of the set of UL transmission patterns mentioned in Step 310.

As shown in FIG. 5, this set of transmission slot patterns corresponds to thirty slots per TTI (i.e. N=2). The empty slots in any row of this set of transmission slot patterns (e.g. the slots that are illustrated with nothing in the first row, the second row, and the third row within this set of transmission slot patterns) indicates that UL transmission of these slots should be prevented, and is forbidden by the processing circuit 110. For example, in this TTI, the UL data are transmitted in slots {0, 1, 2, 3, 4, 5, 6, 7, 8, 9, 10, 11, 12, 13, 14}, the pilots are transmitted in slots {0, 1, 2, 3, 4, 5, 6, 7, 8, 9, 10, 11, 12, 13, 14, 16, 18, 20, 22, 24, 26, 28}, the TPC commands are transmitted in slots {0, 1, 2, 3, 4, 5, 6, 7, 8, 9, 10, 11, 12, 13, 14, 16, 18, 20, 22, 24, 26, 28}, and the TFCIs are transmitted in slots {0, 1, 2}. Similar descriptions for this embodiment are not repeated in detail here.

Figure 6:
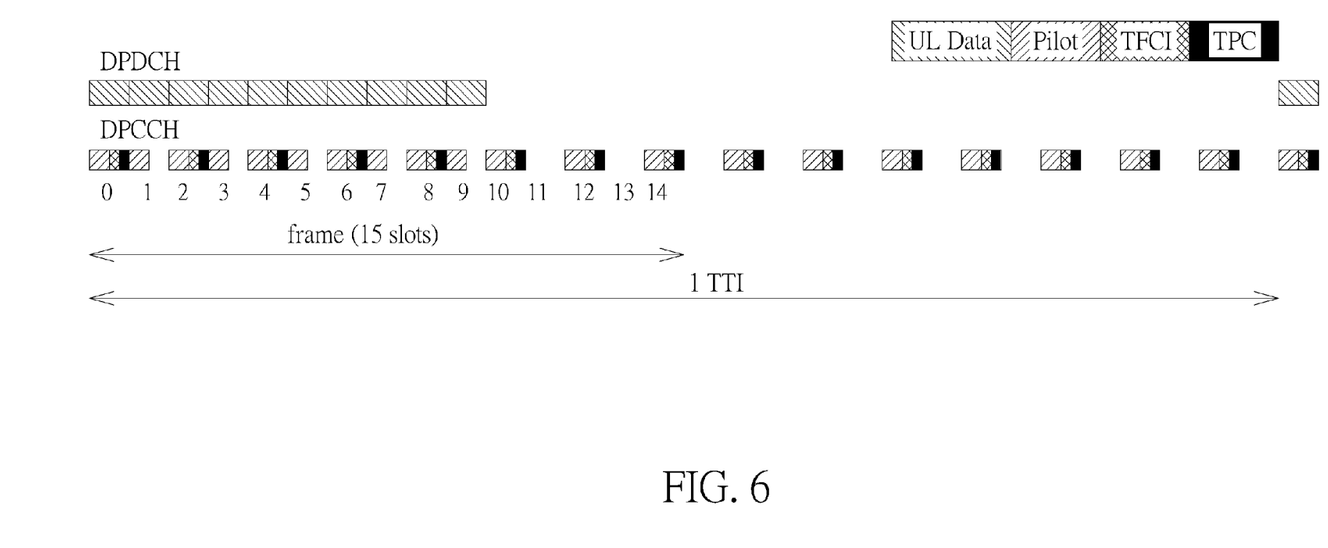
FIG. 6 illustrates a control scheme involved with the method shown in FIG. 3 according to another embodiment of the present invention.

FIG. 6 illustrates a control scheme involved with the method 300 shown in FIG. 3 according to another embodiment of the present invention, where a set of transmission slot patterns for the DPDCH and the DPCCH are illustrated, and the set of transmission slot patterns for the DPDCH and the DPCCH in this embodiment (i.e. the first row and the second row of this set of transmission slot patterns, respectively) can be taken as an example of the set of UL transmission patterns mentioned in Step 310.

As shown in FIG. 6, this set of transmission slot patterns corresponds to thirty slots per TTI (i.e. N=2). The empty slots in any row of this set of transmission slot patterns (e.g. the slots that are illustrated with nothing in the first row and the second row within this set of transmission slot patterns) indicates that UL transmission of these slots should be prevented, and is forbidden by the processing circuit 110. For example, in this TTI, the UL data are transmitted in slots {0, 1, 2, 3, 4, 5, 6, 7, 8, 9}, the pilots are transmitted in slots {0, 1, 2, 3, 4, 5, 6, 7, 8, 9, 10, 12, 14, 16, 18, 20, 22, 24, 26, 28}, the TFCIs are transmitted in slots {0, 2, 4, 6, 8, 10, 12, 14, 16, 18, 20, 22, 24, 26, 28}, and the TPC commands are transmitted in slots {0, 2, 4, 6, 8, 10, 12, 14, 16, 18, 20, 22, 24, 26, 28}. Similar descriptions for this embodiment are not repeated in detail here.

Figure 7:
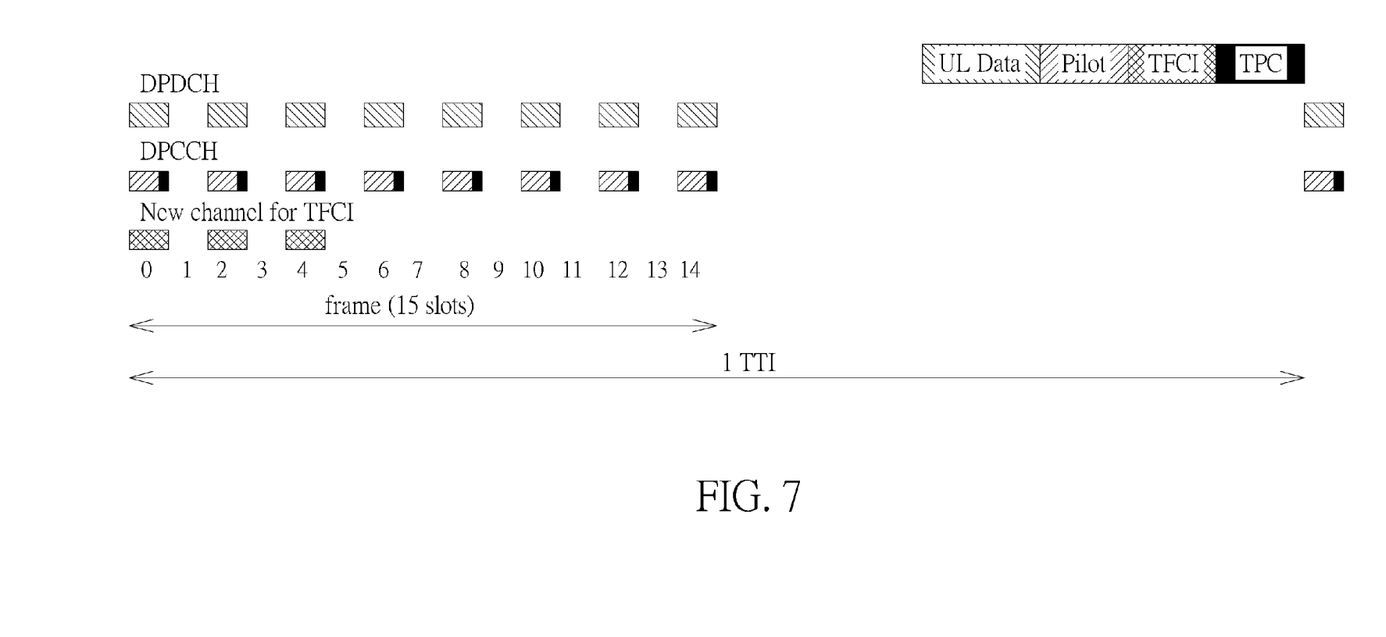
FIG. 7 illustrates a control scheme involved with the method shown in FIG. 3 according to another embodiment of the present invention.

FIG. 7 illustrates a control scheme involved with the method 300 shown in FIG. 3 according to another embodiment of the present invention, where a set of transmission slot patterns for the DPDCH, the DPCCH, and a new channel such as the TFCI channel mentioned above are illustrated, and the set of transmission slot patterns for the DPDCH, the DPCCH, and the TFCI channel in this embodiment (i.e. the first row, the second row, and the third row of this set of transmission slot patterns, respectively) can be taken as an example of the set of UL transmission patterns mentioned in Step 310.

As shown in FIG. 7, this set of transmission slot patterns corresponds to thirty slots per TTI (i.e. N=2). The empty slots in any row of this set of transmission slot patterns (e.g. the slots that are illustrated with nothing in the first row, the second row, and the third row within this set of transmission slot patterns) indicates that UL transmission of these slots should be prevented, and is forbidden by the processing circuit 110. For example, in this TTI, the UL data are transmitted in slots {0, 2, 4, 6, 8, 10, 12, 14}, the pilots are transmitted in slots {0, 2, 4, 6, 8, 10, 12, 14}, the TPC commands are transmitted in slots {0, 2, 4, 6, 8, 10, 12, 14}, and the TFCIs are transmitted in slots {0, 2, 4}. Similar descriptions for this embodiment are not repeated in detail here.

Figure 8:
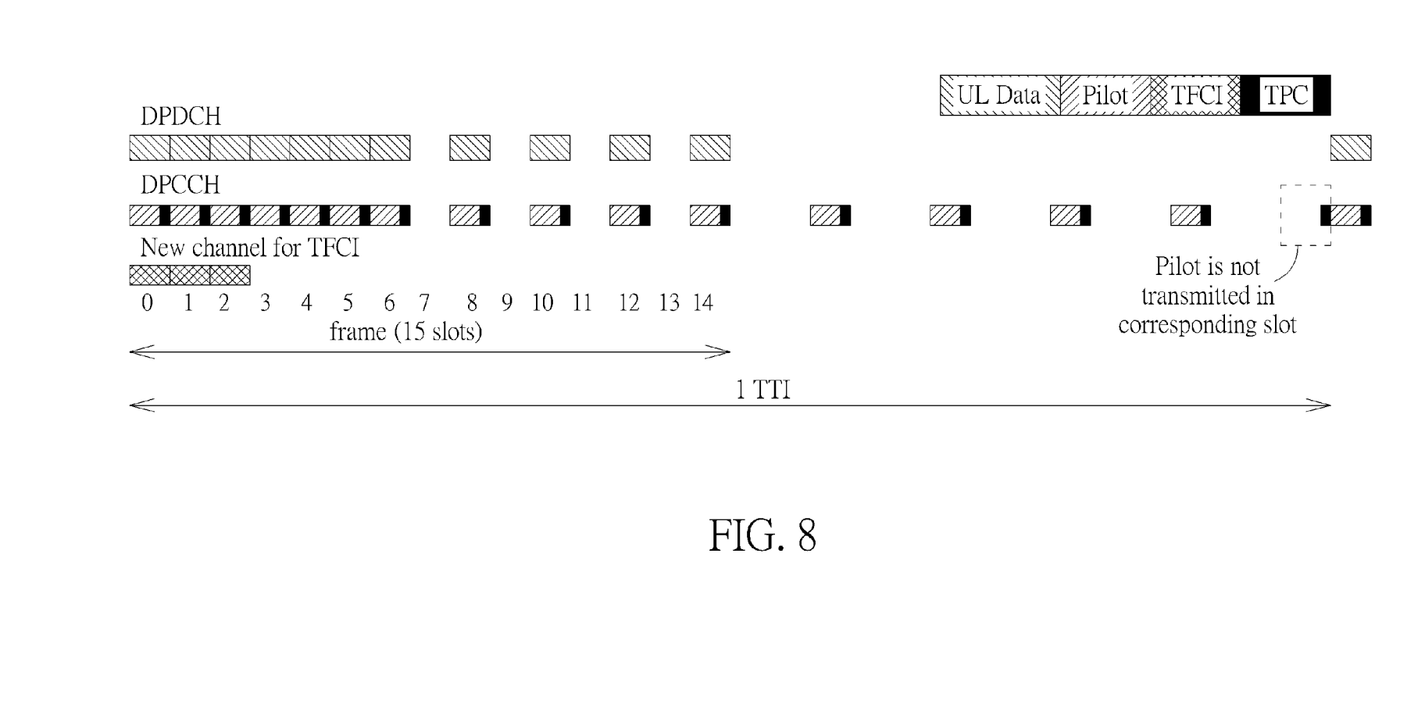
FIG. 8 illustrates a control scheme involved with the method shown in FIG. 3 according to another embodiment of the present invention.

FIG. 8 illustrates a control scheme involved with the method 300 shown in FIG. 3 according to another embodiment of the present invention, where a set of transmission slot patterns for the DPDCH, the DPCCH, and a new channel such as the TFCI channel mentioned above are illustrated, and the set of transmission slot patterns for the DPDCH, the DPCCH, and the TFCI channel in this embodiment (i.e. the first row, the second row, and the third row of this set of transmission slot patterns, respectively) can be taken as an example of the set of UL transmission patterns mentioned in Step 310.

As shown in FIG. 8, this set of transmission slot patterns corresponds to thirty slots per TTI (i.e. N=2). The empty slots in any row of this set of transmission slot patterns (e.g. the slots that are illustrated with nothing in the first row, the second row, and the third row within this set of transmission slot patterns) indicates that UL transmission of these slots should be prevented, and is forbidden by the processing circuit 110. For example, in this TTI, the UL data are transmitted in slots {0, 1, 2, 3, 4, 5, 6, 8, 10, 12, 14}, the pilots are transmitted in slots {0, 1, 2, 3, 4, 5, 6, 8, 10, 12, 14, 17, 20, 23, 26}, the TPC commands are transmitted in slots {0, 1, 2, 3, 4, 5, 6, 8, 10, 12, 14, 17, 20, 23, 26, 29}, and the TFCIs are transmitted in slots {0, 1, 2}. Please note that in the last slot of this TTI (i.e. slot 29), the pilot is not transmitted, since there is pilot transmission nearby, in the first slot of the next TTI. Similar descriptions for this embodiment are not repeated in detail here.

Figure 9:
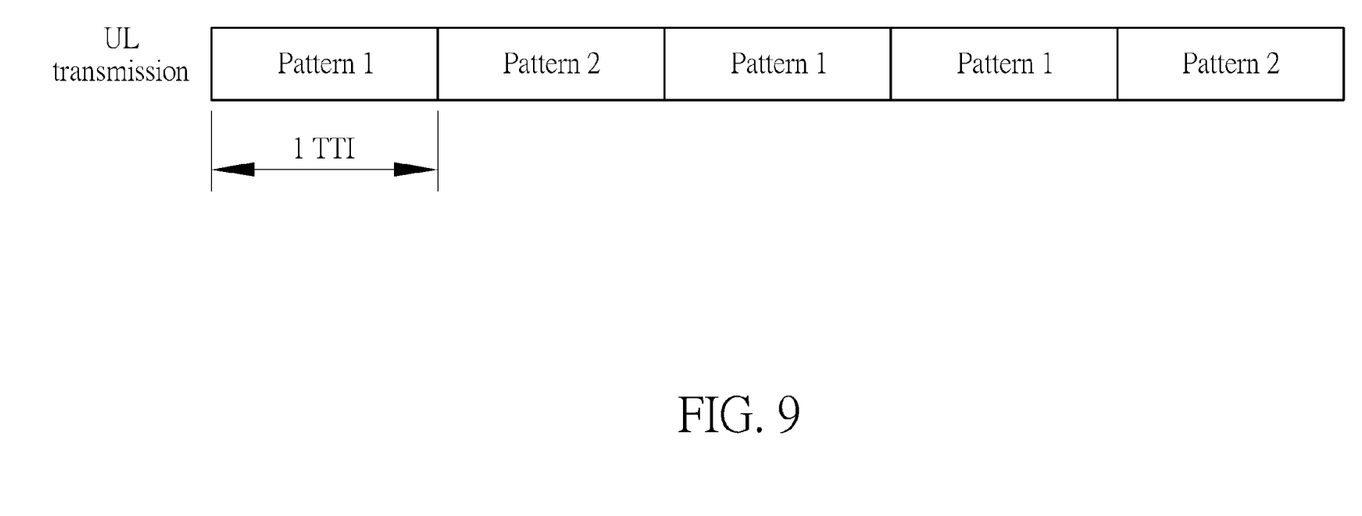
FIG. 9 illustrates a control scheme involved with the method shown in FIG. 3 according to another embodiment of the present invention.

FIG. 9 illustrates a control scheme involved with the method 300 shown in FIG. 3 according to another embodiment of the present invention. As shown in FIG. 9, the processing circuit 110 may dynamically select one set of the plurality of sets of UL transmission patterns mentioned above (e.g. the plurality of sets of transmission slot patterns mentioned above), where the aforementioned set of transmission slot patterns "Pattern 1" and the aforementioned set of transmission slot patterns "Pattern 2" can be taken as an example of the plurality of sets of UL transmission patterns.

For example, the set of transmission slot patterns "Pattern 1" of this embodiment can be equivalent to the set of transmission slot patterns illustrated in FIG. 4, and the set of transmission slot patterns "Pattern 2" of this embodiment can be equivalent to the aforementioned set of transmission slot patterns "Legacy Pattern" which follows the current transmission pattern in UMTS specification. This is for illustrative purposes only, and is not meant to be a limitation of the present invention. According to some embodiments of the present invention, the set of transmission slot patterns "Pattern 1" can be different from the set of transmission slot patterns illustrated in FIG. 4, and the set of transmission slot patterns "Pattern 2" can be different from the set of transmission slot patterns "Legacy Pattern" mentioned above.

Please note that one set of the plurality of sets of UL transmission patterns of this embodiment follows the current transmission pattern in UMTS specification. As the processing circuit 110 may dynamically may switch between different sets of the plurality of sets of UL transmission patterns, the processing circuit 110 of this embodiment may switch between a new set of transmission patterns (e.g. the set of transmission slot patterns "Pattern 1" that is different from what is taught in the related art) and the Legacy set of transmission patterns (e.g. the set of transmission slot patterns "Legacy Pattern" of the related art). Therefore, in comparison with the related art, the UL capacity is improved due to the usage of the new set of transmission patterns. Similar descriptions for this embodiment are not repeated in detail here.

Figure 10:
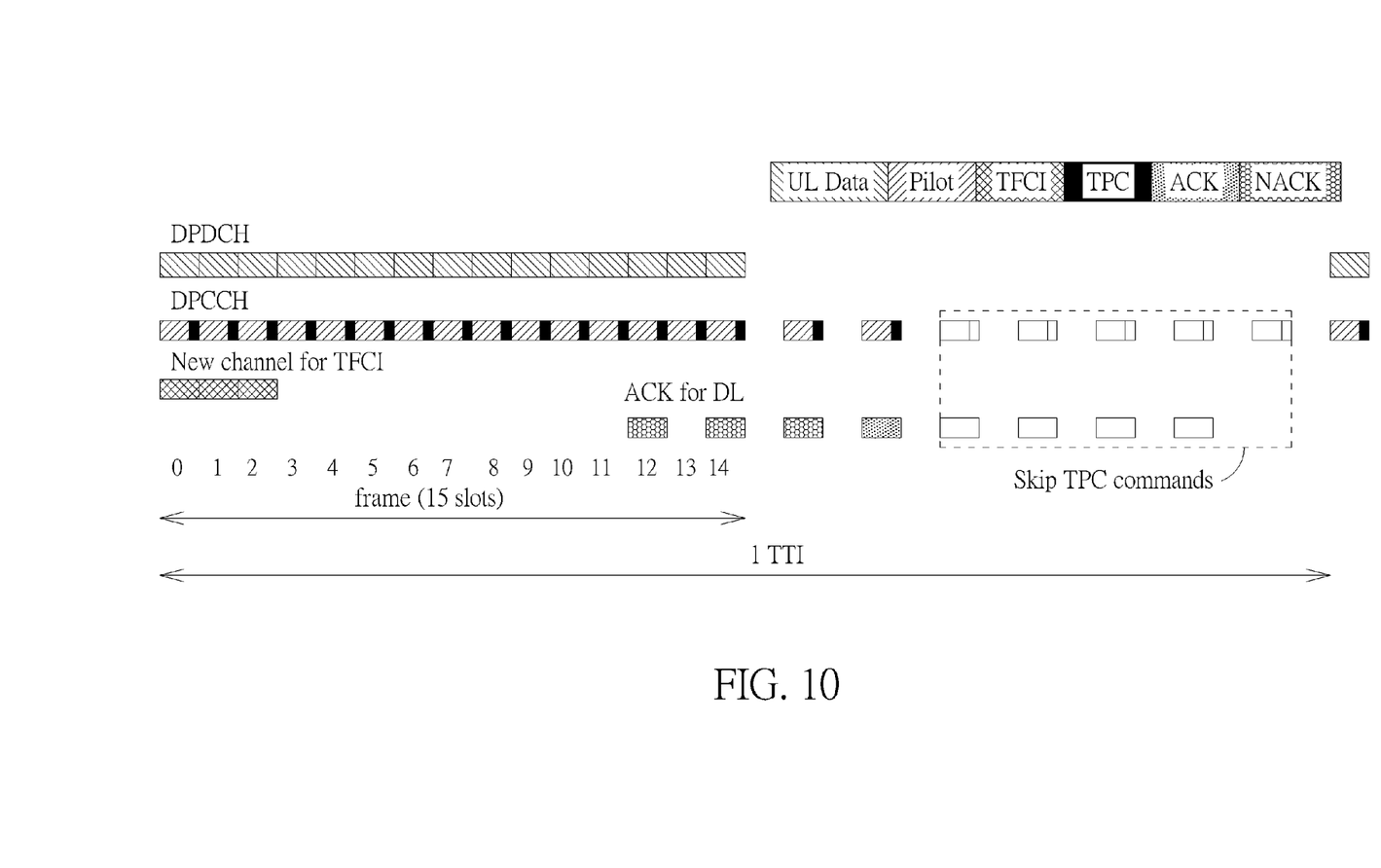
FIG. 10 illustrates a control scheme involved with the method shown in FIG. 3 according to an embodiment of the present invention.

FIG. 10 illustrates a control scheme involved with the method 300 shown in FIG. 3 according to an embodiment of the present invention, where a set of transmission slot patterns for the DPDCH, the DPCCH, and a new channel such as the TFCI channel mentioned above are illustrated, and the set of transmission slot patterns for the DPDCH, the DPCCH, and the TFCI channel in this embodiment (i.e. the first row, the second row, and the third row of this set of transmission slot patterns, respectively) can be taken as an example of the set of UL transmission patterns mentioned in Step 310.

As shown in FIG. 10, this set of transmission slot patterns corresponds to thirty slots per TTI (i.e. N=2). The empty slots in any row of this set of transmission slot patterns (e.g. the slots that are illustrated with nothing in the first row, the second row, and the third row within this set of transmission slot patterns) indicates that UL transmission of these slots should be prevented, and is forbidden by the processing circuit 110. For example, in this TTI, the UL data are transmitted in slots {0, 1, 2, 3, 4, 5, 6, 7, 8, 9, 10, 11, 12, 13, 14}, the pilots are transmitted in slots {0, 1, 2, 3, 4, 5, 6, 7, 8, 9, 10, 11, 12, 13, 14, 16, 18}, the TPC commands are transmitted in slots {0, 1, 2, 3, 4, 5, 6, 7, 8, 9, 10, 11, 12, 13, 14, 16, 18}, and the TFCIs are transmitted in slots {0, 1, 2}. In this example, the Negative ACK (NACK) for DL is transmitted in some slots such as slots 12, 14, and 16, respectively. Please note that the ACK for DL is transmitted in slot 18, so the processing circuit 110 may skip all TPC commands in the following slots within this TTI, such as those of slots {20, 22, 24, 26, 28}, and may also skip the associated pilots of slots {20, 22, 24, 26, 28}. Therefore, in slots {20, 22, 24, 26, 28} of this TTI, the pilots and the TPC commands are not transmitted. Similar descriptions for this embodiment are not repeated in detail here.

Figure 11:
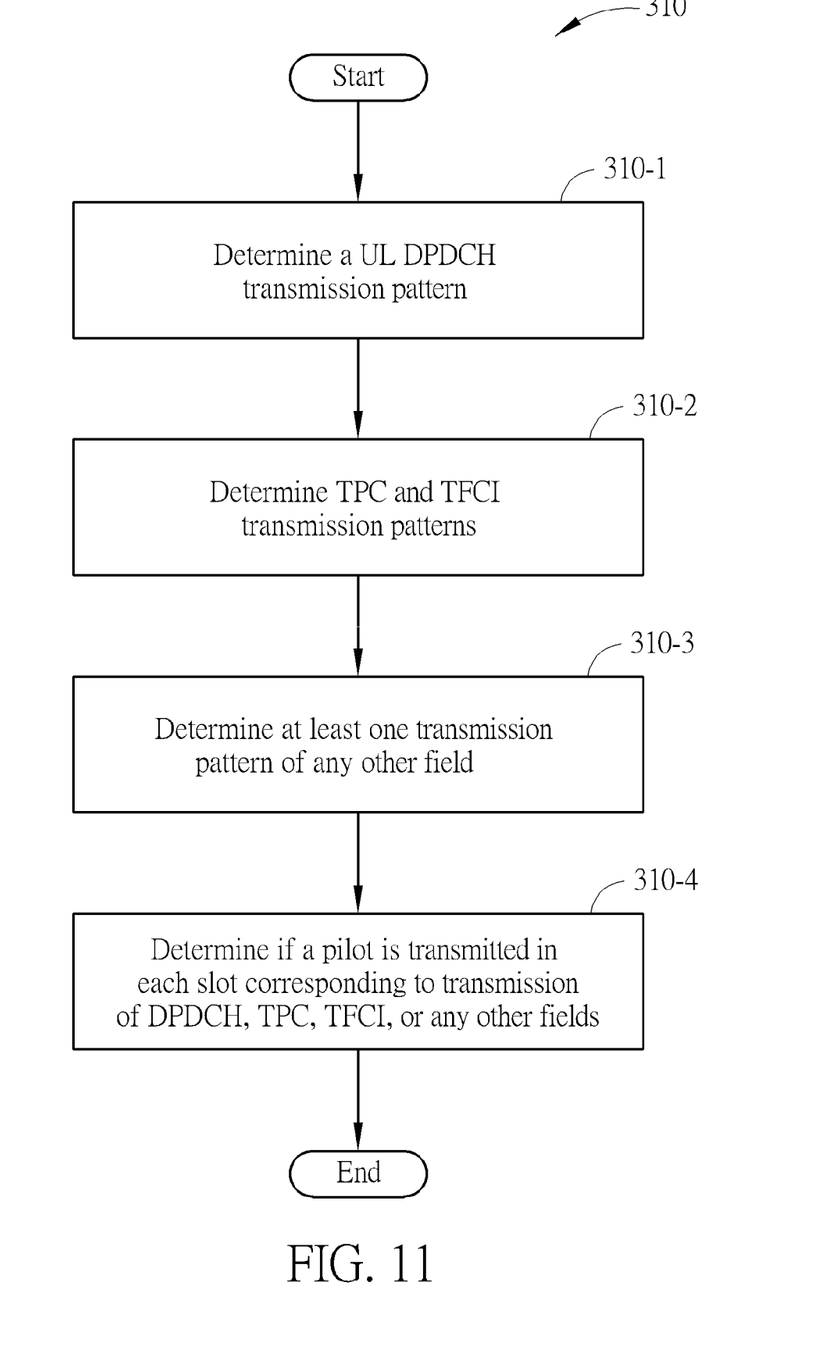
FIG. 11 illustrates a working flow involved with the method shown in FIG. 3 according to an embodiment of the present invention.

FIG. 11 illustrates a working flow involved with the method shown in FIG. 3 according to an embodiment of the present invention, where this working flow can be applied to Step 310. In Step 310-1, the processing circuit 110 determines a UL DPDCH transmission pattern. In Step 310-2, the processing circuit 110 determines TPC and TFCI transmission patterns. In Step 310-3, the processing circuit 110 determines at least one transmission pattern of any other field. In Step 310-4, the processing circuit 110 determines if a pilot is transmitted in each slot corresponding to transmission of DPDCH, TPC, TFCI, or any other fields. Please note that the implementation details of the operations of Step 310-1, Step 310-2, Step 310-3, and Step 310-4 in the working flow shown in FIG. 11 have been described in the above embodiments of the present invention. For brevity, similar descriptions for this embodiment are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing uplink (UL) transmission control of an electronic device, the method comprising the steps of:
    determining a set of UL transmission patterns for a dedicated physical data channel (DPDCH) and a dedicated physical control channel (DPCCH), wherein one of the set of UL transmission patterns indicates whether UL transmission of a plurality of slots of one of the DPDCH and the DPCCH in at least one transmission time interval (TTI) is required, respectively; and
    performing UL transmission of the DPDCH and the DPCCH according to the set of UL transmission patterns, wherein with aid of a UL transmission pattern for the DPDCH within the set of UL transmission patterns, UL transmission of at least one slot of the DPDCH is prevented in the at least one TTI;
    wherein the step of determining the set of UL transmission patterns for the DPDCH and the DPCCH further comprises:
    based on at least one predetermined rule, determining a UL transmission pattern for the DPCCH within the set of UL transmission patterns according to at least one characteristic of the DPDCH, to prevent at least one pilot of at least one slot of the DPCCH from being transmitted in the at least one TTI;
    wherein the step of determining the UL transmission pattern for the DPCCH according to the at least one characteristic of the DPDCH further comprises:
    based on the at least one predetermined rule, when it is detected that no UL transmission of a specific slot of the DPDCH in the at least one TTI is required, determining whether UL transmission of any of a Transport Format Combination Indicator (TFCI) field and a Transmit Power Control (TPC) field within a corresponding slot of the DPCCH in the at least one TTI is required, to determine the UL transmission pattern for the DPCCH to selectively prevent UL transmission of the corresponding slot of the DPCCH in the at least one TTI according to at least one characteristic of the DPCCH, wherein whether UL transmission of the corresponding slot of the DPCCH in the at least one TTI is allowed corresponds to whether the UL transmission of the any of the TFCI field and the TPC field within the corresponding slot of the DPCCH in the at least one TTI is required.

2. The method of claim 1, wherein the step of determining the UL transmission pattern for the DPCCH according to the at least one characteristic of the DPDCH further comprises:
    based on the at least one predetermined rule, when it is detected that no UL transmission of the specific slot of the DPDCH in the at least one TTI is required and UL transmission of any of the TFCI field and the TPC field within the corresponding slot of the DPCCH in the at least one TTI is not required, determining the UL transmission pattern for the DPCCH to prevent UL transmission of the corresponding slot of the DPCCH in the at least one TTI.

3. The method of claim 1, wherein the step of determining the UL transmission pattern for the DPCCH according to the at least one characteristic of the DPDCH further comprises:
based on the at least one predetermined rule, when it is detected that no UL transmission of the specific slot of the DPDCH in the at least one TTI is required and UL transmission of any of the TFCI field and the TPC field within the corresponding slot of the DPCCH in the at least one TTI is required, determining the UL transmission pattern for the DPCCH to allow UL transmission of the corresponding slot of the DPCCH in the at least one TTI.

4. The method of claim 1, wherein the step of determining the UL transmission pattern for the DPCCH according to the at least one characteristic of the DPDCH further comprises:
based on the at least one predetermined rule, when it is detected that no UL transmission of the specific slot of the DPDCH in the at least one TTI is required and UL transmission of any of the TFCI field and the TPC field within the corresponding slot of the DPCCH in the at least one TTI is required and UL transmission of a pilot field within an adjacent slot of the DPCCH in the at least one TTI is required, determining the UL transmission pattern for the DPCCH to prevent UL transmission of a pilot field within the corresponding slot of the DPCCH in the at least one TTI.

5. A method for performing uplink (UL) transmission control of an electronic device, the method comprising the steps of:
determining a set of UL transmission patterns for a dedicated physical data channel (DPDCH) and a dedicated physical control channel (DPCCH), wherein one of the set of UL transmission patterns indicates whether UL transmission of a plurality of slots of one of the DPDCH and the DPCCH in at least one transmission time interval (TTI) is required, respectively; and
performing UL transmission of the DPDCH and the DPCCH according to the set of UL transmission patterns, wherein with aid of a UL transmission pattern for the DPDCH within the set of UL transmission patterns, UL transmission of at least one slot of the DPDCH is prevented in the at least one TTI;
wherein the step of determining the set of UL transmission patterns for the DPDCH and the DPCCH further comprises:
based on at least one predetermined rule, when it is detected that no UL transmission of a specific slot of the DPDCH in the at least one TTI is required and an acknowledgement (ACK) for downlink (DL) is determined to be sent before a time point of the specific slot of the DPDCH in the at least one TTI, determining a UL transmission pattern for the DPCCH to prevent UL transmission of at least one subsequent slot of the DPCCH in the at least one TTI, wherein the at least one subsequent slot of the DPCCH comprises a corresponding slot of the DPCCH in the at least one TTI.

6. The method of claim 1, further comprising:
setting a transmission slot pattern indicator based on at least one predetermined rule, for use of performing UL transmission of the DPDCH and the DPCCH, wherein the transmission slot pattern indicator comprises a plurality of elements, and an element of the plurality of elements indicates whether to transmit content of at least one field within an associated slot of the plurality of slots of the one of the DPDCH and the DPCCH in the at least one TTI.

7. The method of claim 1, further comprising:
in the at least one TTI, transmitting at least one TFCI by utilizing a TFCI channel, rather than the DPCCH.

8. The method of claim 1, further comprising:
adjusting a spreading factor of the electronic device; and
adjusting at least one of a power difference between power of the DPCCH and power of the DPDCH, a ratio of the power of the DPCCH to the power of the DPDCH, and a reciprocal of the ratio.

9. The method of claim 1, further comprising:
dynamically selecting one set of a plurality of sets of UL transmission patterns, wherein the plurality of sets of UL transmission patterns comprises the set of UL transmission patterns; and
dynamically performing UL transmission of the DPDCH and the DPCCH according to the selected one set of the plurality of sets of UL transmission patterns.

10. The method of claim 9, wherein the plurality of sets of UL transmission patterns comprises a first set of UL transmission patterns and a second set of UL transmission patterns that are utilized in TTIs of different conditions, respectively; and the set of UL transmission patterns is one set of the first set of UL transmission patterns and the second set of UL transmission patterns.

11. The method of claim 9, wherein the plurality of sets of UL transmission patterns comprises two or more sets of UL transmission patterns respectively corresponding to different numbers of slots per TTI; and the set of UL transmission pattern is one set of the two or more sets of UL transmission patterns.

12. An apparatus for performing uplink (UL) transmission control of an electronic device, the apparatus comprising at least one portion of the electronic device, the apparatus comprising:
a transmitter arranged to transmit information for the electronic device; and
a processing circuit, coupled to the transmitter, arranged to determine a set of UL transmission patterns for a dedicated physical data channel (DPDCH) and a dedicated physical control channel (DPCCH), wherein one of the set of UL transmission patterns indicates whether UL transmission of a plurality of slots of one of the DPDCH and the DPCCH in at least one transmission time interval (TTI) is required, respectively, and the transmitter performs UL transmission of the DPDCH and the DPCCH according to the set of UL transmission patterns;
wherein with aid of a UL transmission pattern for the DPDCH within the set of UL transmission patterns, UL transmission of at least one slot of the DPDCH is prevented in the at least one TTI;
based on at least one predetermined rule, the processing circuit determines a UL transmission pattern for the DPCCH within the set of UL transmission patterns according to at least one characteristic of the DPDCH, to prevent at least one pilot of at least one slot of the DPCCH from being transmitted in the at least one TTI; and
based on the at least one predetermined rule, when it is detected that no UL transmission of a specific slot of the DPDCH in the at least one TTI is required, the processing circuit determines whether UL transmission of any of a Transport Format Combination Indicator (TFCI) field and a Transmit Power Control (TPC) field within a corresponding slot of the DPCCH in the at least one TTI is required, to determine the UL transmission pattern for the DPCCH to selectively prevent UL transmission of the corresponding slot of the DPCCH in the at least one TTI according to at least one characteristic of the DPCCH, wherein whether UL transmission of the corresponding slot of the DPCCH in the at least one TTI is allowed corresponds to whether the UL transmission of the any of the TFCI field and the TPC field within the corresponding slot of the DPCCH in the at least one TTI is required.

13. The apparatus of claim 12, wherein based on the at least one predetermined rule, when it is detected that no UL transmission of the specific slot of the DPDCH in the at least one TTI is required and UL transmission of any of the TFCI field and the TPC field within the corresponding slot of the DPCCH in the at least one TTI is not required, the processing circuit determines the UL transmission pattern for the DPCCH to prevent UL transmission of the corresponding slot of the DPCCH in the at least one TTI.

14. The apparatus of claim 12, wherein based on the at least one predetermined rule, when it is detected that no UL transmission of the specific slot of the DPDCH in the at least one TTI is required and UL transmission of any of the TFCI field and the TPC field within the corresponding slot of the DPCCH in the at least one TTI is required, the processing circuit determines the UL transmission pattern for the DPCCH to allow UL transmission of the corresponding slot of the DPCCH in the at least one TTI.

15. The apparatus of claim 12, wherein based on the at least one predetermined rule, when it is detected that no UL transmission of the specific slot of the DPDCH in the at least one TTI is required and UL transmission of any of the TFCI field and the TPC field within the corresponding slot of the DPCCH in the at least one TTI is required and UL transmission of a pilot field within an adjacent slot of the DPCCH in the at least one TTI is required, the processing circuit determines the UL transmission pattern for the DPCCH to prevent UL transmission of a pilot field within the corresponding slot of the DPCCH in the at least one TTI.

16. An apparatus for performing uplink (UL) transmission control of an electronic device, the apparatus comprising at least one portion of the electronic device, the apparatus comprising:
    a transmitter arranged to transmit information for the electronic device; and
    a processing circuit, coupled to the transmitter, arranged to determine a set of UL transmission patterns for a dedicated physical data channel (DPDCH) and a dedicated physical control channel (DPCCH), wherein one of the set of UL transmission patterns indicates whether UL transmission of a plurality of slots of one of the DPDCH and the DPCCH in at least one transmission time interval (TTI) is required, respectively, and the transmitter performs UL transmission of the DPDCH and the DPCCH according to the set of UL transmission patterns;
  wherein with aid of a UL transmission pattern for the DPDCH within the set of UL transmission patterns, UL transmission of at least one slot of the DPDCH is prevented in the at least one TTI; and
  based on at least one predetermined rule, when it is detected that no UL transmission of a specific slot of the DPDCH in the at least one TTI is required and an acknowledgement (ACK) for downlink (DL) is determined to be sent before a time point of the specific slot of the DPDCH in the at least one TTI, the processing circuit determines a UL transmission pattern for the DPCCH to prevent UL transmission of at least one subsequent slot of the DPCCH in the at least one TTI; and the at least one subsequent slot of the DPCCH comprises a corresponding slot of the DPCCH in the at least one TTI.

\* \* \* \* \*